US012308532B2

(12) United States Patent
Singh et al.

(10) Patent No.: US 12,308,532 B2
(45) Date of Patent: *May 20, 2025

(54) WIDEBAND PHASED ARRAY ANTENNA FOR MILLIMETER WAVE COMMUNICATIONS

(71) Applicant: KYOCERA AVX Components (San Diego), Inc., San Diego, CA (US)

(72) Inventors: Abhishek Singh, San Diego, CA (US); Mehak Garg, San Diego, CA (US); Jeffrey L. Hilbert, Dana Point, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/315,851

(22) Filed: May 11, 2023

(65) Prior Publication Data

US 2023/0282979 A1 Sep. 7, 2023

Related U.S. Application Data

(63) Continuation of application No. 17/506,998, filed on Oct. 21, 2021, now Pat. No. 11,688,944.

(Continued)

(51) Int. Cl.

*H01Q 5/385* (2015.01)
*H01Q 1/42* (2006.01)
*H01Q 3/36* (2006.01)

(52) U.S. Cl.

CPC ............. *H01Q 5/385* (2015.01); *H01Q 1/422* (2013.01); *H01Q 3/36* (2013.01)

(58) Field of Classification Search

CPC ........... H01Q 5/385; H01Q 1/422; H01Q 3/36

See application file for complete search history.

(56) References Cited

U.S. PATENT DOCUMENTS 3,987,453 A * 10/1976 Lopez .................... H01Q 13/18 343/789
5,389,939 A * 2/1995 Tang ........................ H01Q 5/42 343/753

(Continued)

OTHER PUBLICATIONS

Al-Saedi Hussam et al, “A Low-Cost Ka-Band Circularly Polarized Passive Phased-Array Antenna for Mobile Satellite Application”, Transactions on Antennas and Propogation, vol. 67, No. 1, Jan. 1, 2019. (12 pages).

(Continued)

*Primary Examiner* — Lam T Mai

(74) *Attorney, Agent, or Firm* — Dority & Manning, P.A.

(57) ABSTRACT

A wideband phased array antenna is provided. The wideband phased array antenna includes a plurality of antenna cells. Each of the antenna cells is configured to communicate over a frequency band ranging from 24 GHz to 52 GHz. Furthermore, one or more of the antenna cells includes a driven element and a parasitic element. The driven element is disposed on a first substrate that includes a first dielectric material. The parasitic element is disposed on a second substrate positioned relative to the first substrate such that a gap is defined between the first substrate and the second substrate. The second substrate includes a second dielectric material that is different than the first dielectric material.

20 Claims, 10 Drawing Sheets

Related U.S. Application Data

(60) Provisional application No. 63/105,605, filed on Oct. 26, 2020.

(56) References Cited

U.S. PATENT DOCUMENTS

| | | | | | |
|---|---|---|---|---|---|
| 6,300,906 | B1 * | 10/2001 | Rawnick | H01Q 1/38 | 343/700 MS |
| 6,300,918 | B1 * | 10/2001 | Riddle | H01Q 9/27 | 343/895 |
| 6,344,830 | B1 * | 2/2002 | Taylor | H01Q 21/24 | 343/770 |
| 6,388,631 | B1 * | 5/2002 | Livingston | H01Q 3/24 | 343/770 |
| 6,512,487 | B1 * | 1/2003 | Taylor | H01Q 9/285 | 343/797 |
| 6,552,687 | B1 * | 4/2003 | Rawnick | H01Q 21/062 | 343/848 |
| 6,958,738 | B1 * | 10/2005 | Durham | H01Q 9/16 | 343/756 |
| 11,688,944 | B2 * | 6/2023 | Singh | H01Q 1/422 | 343/702 |
| 2002/0050951 | A1 * | 5/2002 | Durham | H01Q 21/0087 | 343/909 |
| 2002/0140616 | A1 * | 10/2002 | Kanamaluru | H01Q 5/42 | 343/756 |
| 2003/0132890 | A1 * | 7/2003 | Rawnick | H01Q 15/0013 | 343/700 R |
| 2004/0104860 | A1 * | 6/2004 | Durham | H01Q 1/405 | 343/785 |
| 2005/0030244 | A1 * | 2/2005 | Durham | H01Q 9/0442 | 343/700 MS |
| 2005/0030245 | A1 * | 2/2005 | Croswell | H01Q 9/28 | 343/700 MS |
| 2005/0030246 | A1 * | 2/2005 | Durham | H01Q 9/285 | 343/700 MS |
| 2005/0035915 | A1 * | 2/2005 | Livingston | H01Q 1/422 | 343/754 |
| 2005/0057431 | A1 * | 3/2005 | Brown | H01Q 15/0013 | 343/909 |
| 2005/0179608 | A1 * | 8/2005 | Durham | H01Q 21/0006 | 343/810 |
| 2005/0237264 | A1 * | 10/2005 | Durham | H01Q 3/46 | 343/756 |
| 2005/0237265 | A1 * | 10/2005 | Durham | H01Q 25/007 | 343/756 |
| 2005/0237267 | A1 * | 10/2005 | Brown | H01Q 1/281 | 343/756 |
| 2006/0097947 | A1 * | 5/2006 | McCarville | H01Q 21/062 | 343/797 |
| 2007/0176827 | A1 * | 8/2007 | Itoh | H01Q 13/206 | 343/700 MS |
| 2008/0048917 | A1 * | 2/2008 | Achour | H01Q 9/0407 | 343/700 MS |
| 2008/0246680 | A1 * | 10/2008 | Rawnick | H01Q 21/00 | 343/810 |
| 2009/0322620 | A1 * | 12/2009 | Pedersen | H05K 3/366 | 29/601 |
| 2010/0007572 | A1 * | 1/2010 | Jones | H01Q 9/28 | 343/798 |
| 2010/0271280 | A1 * | 10/2010 | Pickles | H01Q 9/16 | 343/858 |
| 2011/0057852 | A1 * | 3/2011 | Holland | H01Q 13/085 | 343/810 |
| 2011/0267998 | A1 * | 11/2011 | Meharry | H01Q 3/24 | 343/876 |
| 2012/0146869 | A1 * | 6/2012 | Holland | H01Q 21/26 | 343/795 |
| 2013/0063325 | A1 * | 3/2013 | Legare | H01Q 3/24 | 343/906 |
| 2013/0249751 | A1 * | 9/2013 | Legare | H01Q 21/061 | 343/745 |
| 2015/0097634 | A1 | 4/2015 | Ghassemi et al. | | |
| 2020/0021010 | A1 | 1/2020 | Ou et al. | | |
| 2020/0259267 | A1 | 8/2020 | Park et al. | | |
| 2021/0336342 | A1 | 10/2021 | Gouchi | | |
| 2022/0328953 | A1 * | 10/2022 | Huang | H01Q 9/0457 | |

OTHER PUBLICATIONS

Steven Brebels et al, "3D System-In-Package Integration of 60 GHz Aperture-Coupled Micromachined Microstrip Antennas", Microwave Symposium Digest (MTT), Piscataway, NJ, May 23, 2010. (4 pages).

Tan Qiulin et al, "Measurement of Relative Permittivity of LTCC Ceramic at Different Temperatures", AIP Advances, American Institute of Physics, vol. 4, No. 3, Melville, NY, Feb. 27, 2014. (6 pages).

The International Search Report and Written Opinion Corresponding to Application No. PCT/US2021/056017 on Jan. 14, 2022. (20 pages).

* cited by examiner

WIDEBAND PHASED ARRAY ANTENNA FOR MILLIMETER WAVE COMMUNICATIONS

PRIORITY CLAIM

The present application is a continuation of and claims the benefit of priority under 35 U.S.C. § 120 to U.S. patent application Ser. No. 17/506,998, filed Oct. 21, 2021, titled "Wideband Phased Array Antenna for Millimeter Wave Communications," which, in turn, claims the benefit of priority under 35 U.S.C. § 119 (e) of United States-Provisional to U.S. Prov App. Ser. No. 63/105,605, filed Oct. 26, 2020, titled "Wideband Phased Array Antenna for Millimeter Wave Communications"; each of which is hereby incorporated by reference herein in its entirety and for all purposes.

FIELD

The present disclosure relates generally to phased array antennas. More particularly, the present disclosure relates to a wideband phased array antenna for millimeter wave communications.

BACKGROUND

Antenna systems configured for millimeter-wave communications (e.g., $5^{th}$ generation mobile communications) can include a phase shifter circuit and a phased array antenna electrically coupled to the phase shifter circuit. The phase shifter circuit can alter a phase of a RF signal received from a RF source such that a phase of the RF signal measured at an output of the RF phase shifter circuit is different relative to a phase of the RF signal measured at an input of the RF phase shifter circuit. In this manner, the RF phase shifter circuit can control a phase shift of the RF signal to steer a radiation pattern associated with the phased array antenna.

SUMMARY

Aspects and advantages of embodiments of the present disclosure will be set forth in part in the following description, or may be learned from the description, or may be learned through practice of the embodiments.

In one aspect, a wideband phased array antenna is provided. The wideband phased array antenna includes a plurality of antenna cells. Each of the antenna cells is configured to communicate over a frequency band ranging from 24 GHz to 52 GHz. Furthermore, one or more of the antenna cells includes a driven element and a parasitic element. The driven element is disposed on a first substrate that includes a first dielectric material. The parasitic element is disposed on a second substrate positioned relative to the first substrate such that a gap is defined between the first substrate and the second substrate. The second substrate includes a second dielectric material that is different than the first dielectric material.

In some implementations, a scan range of the phased array antenna in an azimuth plane is wider than a scan range of the phased array antenna in an elevation plane.

In some implementations, the first dielectric material has a first permittivity, and the second dielectric material has a second permittivity that is different than the first permittivity. For instance, in some implementations, the first permittivity can be greater than the second permittivity. In some implementations, a ratio of the first permittivity to the second permittivity is about 3. In some implementations, the first dielectric material includes a first polytetrafluoroethylene (PTFE) composite, and the second dielectric material includes a second PTFE. Furthermore, the second PTFE can be different than the first PTFE.

In some implementations, the second substrate is thicker than the first substrate. For instance, a ratio of a thickness of the second substrate to a thickness of the first substrate can be about 2. Alternatively, or additionally, the frequency band can range from 24 Gigahertz (GHz) to 30 GHz or from 30 GHz to 40 GHz.

In another aspect, an antenna system is provided. The antenna system includes a phase shifter circuit electrically coupled to a radio frequency (RF) source. The antenna system further includes a wideband phased array antenna includes a plurality of antenna cells. Each of the antenna cells is configured to communicate over a frequency band ranging from 24 GHz to 52 GHz. Furthermore, one or more of the antenna cells includes a driven element and a parasitic element. The driven element is disposed on a first substrate that includes a first dielectric material. The parasitic element is disposed on a second substrate positioned relative to the first substrate such that a gap is defined between the first substrate and the second substrate. The second substrate includes a second dielectric material that is different than the first dielectric material.

In some implementations, a cross-sectional area of the driven element is smaller than a cross-sectional area of the parasitic element. Alternatively, or additionally, a bandwidth of the one or more antenna cells is about 1400 Megahertz (MHz). In some implementations, the second substrate can be thicker than the first substrate.

In some implementations, the first dielectric material has a first permittivity, and the second dielectric material has a second permittivity that is different than the first permittivity. For instance, in some implementations, the first permittivity can be greater than the second permittivity.

In some implementations, a gain associated with a main lobe of a radiation pattern of the phased array antenna in an azimuth plane is substantially the same as a gain associated with a main lobe of a radiation pattern of the phased array antenna in an elevation plane.

In some implementations, a scan range of the phased array antenna in an azimuth plane is wider than a scan range of the phased array antenna in an elevation plane. For instance, in some implementations, the scan range in the azimuth plane ranged from 80 degrees to 120 degrees, whereas the scan range in the elevation plane ranges from 20 degrees to 40 degrees.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
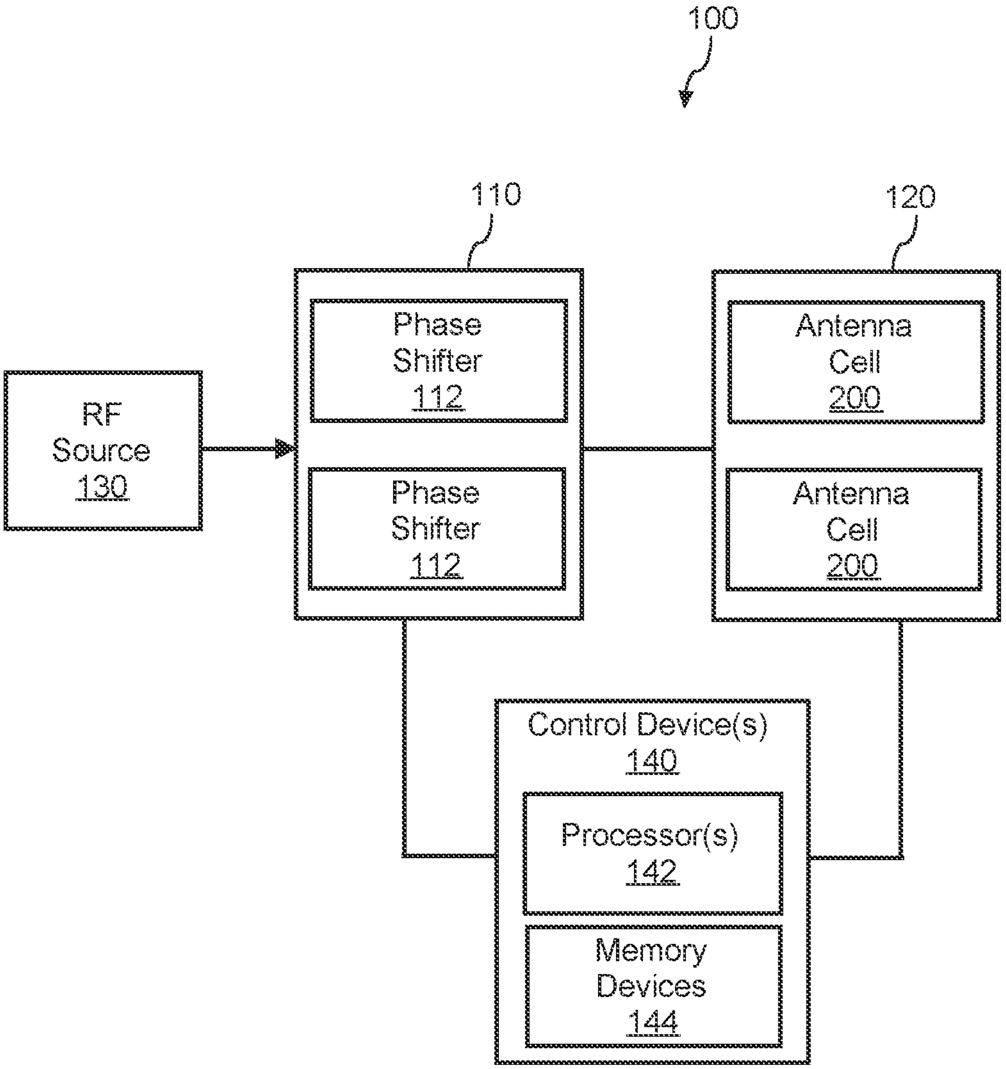
FIG. 1 depicts a block diagram of components of an antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Phased array antennas include a plurality of antenna cells. Each of the plurality of antenna cells can be electrically coupled to a phase shifter circuit. The phase shifter circuit can be configured to control a phase shift associated with a RF signal provided to the phased array antenna. By controlling the phase shift associated with the RF signal, a radiation pattern associated with the phased array antenna can be steered without physically moving one or more of the antenna cells. However, characteristics (e.g., gain) associated with the radiation pattern of the phased array antenna may not be uniform over a wide passband (e.g., about 24 gigahertz (GHz) to about 52 GHz) associated with millimeter communications.

Example aspects of the present disclosure are directed to a wideband phased array antenna for millimeter wave communications. The wideband phased array antenna can include a plurality of antenna cells. For instance, in some implementations, the wideband phased array antenna can include 128 antenna cells. In alternative implementations, the wideband phased array antenna can include more or fewer antenna cells. Each of the antenna cells can be configured to communicate over a frequency band associated with millimeter wave communications (e.g., about 24 GHz to about 52 GHz). Details of the antenna cells will now be discussed in more detail.

Each of the antenna cells can include a driven element and a parasitic element. The driven element can be electrically coupled to an RF source via a phase shifter circuit. The parasitic element can be electromagnetically coupled with the driven element. In this manner, the electromagnetic coupling between the driven element and the parasitic element can increase the bandwidth of the corresponding antenna cell. For instance, in some implementations, the bandwidth of each of the antenna cells can be about 1400 Megahertz (MHz).

In some implementations, the driven element and the parasitic element can each include a patch antenna. For instance, the driven element can include a first patch antenna disposed on a first substrate that include a first dielectric material having a first permittivity, $\varepsilon_{R1}$. The parasitic element can include a second patch antenna disposed on a second substrate positioned relative to the first substrate such that a gap is defined between the first substrate and the second substrate. In this manner, each of the antenna cells have a stacked patch topology.

The second substrate can include a second dielectric material having a second permittivity, $\varepsilon_{R2}$. The second dielectric material can be different from the first dielectric material. For instance, in some implementations, the first dielectric material can include a first polytetrafluoroethylene (PTFE) composite (e.g., Rogers RO3006), whereas the second dielectric material can include a second PTFE composite (e.g., Rogers RT5880) that is different from the first PTFE composite. Alternatively, or additionally, the first permittivity, $\varepsilon_{R1}$, can be greater than the second permittivity, $\varepsilon_{R2}$. For instance, in some implementations, a ratio of the first permittivity, $\varepsilon_{R1}$, to the second permittivity, $\varepsilon_{R2}$, can be about 3.

The wideband phased array antenna of the present disclosure provides numerous technical advantages. For instance, the stacked patch topology associated with each of the antenna cells can allow characteristics associated with the radiation pattern of the wideband phased array antenna to be uniform over the wide passband associated with millimeter wave communications. For instance, a gain associated with a main lobe of the radiation pattern can be substantially the same (e.g., within 5 decibels, within 1 decibel) over the passband. Furthermore, a scan range of the phased array antenna in the azimuth plane can be wider than a scan range of the phased array antenna in the elevation plane. For instance, in some implementations, the scan range of the wideband phased array antenna in the azimuth plane can be about 100 degrees, whereas the scan range of the wideband phased array antenna in the elevation plane can be about 30 degrees.

As used herein, the use of the term "about" in conjunction with a numerical value is intended to refer to within 20% of the stated amount. In addition, the terms "first" and "second" may be used interchangeably to distinguish one component from another and are not intended to signify location or importance of the individual components.

Referring now to the FIGS., FIG. 1 depicts an antenna system 100 according to example embodiments of the present disclosure. As shown, the antenna system 100 can include a RF phase shifter circuit 110 and a wideband phased array antenna 120. The RF phase shifter circuit 110 can include a plurality of millimeter wave phase shifters 112.

Each of the millimeter wave phase shifters 112 can be electrically coupled to a RF source 130. In this manner, each of the millimeter wave phase shifters 112 can receive a RF signal from the RF source 130. The RF signal can be associated with millimeter wave communications. In this manner, a frequency of the RF signal can range from about 24 GHz to about 52 GHz. For instance, in some implementations, the frequency of the RF signal can range from 24 GHz to 30 GHz. In alternative implementations, the frequency of the RF signal can range from 30 GHz to 40 GHz. It should be understood that each of the millimeter wave phase shifters 112 can be configured to control a phase shift of the RF signal received from the RF source 130. In this manner, the radiation pattern of RF waves emitted via the wideband phased array antenna 120 can be steered without physically moving one or more antenna cells of a plurality of antenna cells 200 of the wideband phased array antenna 120.

The antenna system 100 can include one or more control devices 140. The one or more control devices 140 can be communicatively coupled to the wideband phased array antenna 120. In this manner, the one or more control devices 140 can be configured to control an array of antenna cells 200 of the wideband phased array antenna 120 to steer a radiation pattern associated with the wideband phased array antenna 120 along at least one of an azimuth plane or an elevation plane. As will be discussed below in more detail, the one or more control devices 140 can control the array of antenna cells 200 to steer one or more nulls associated with the radiation pattern along at least one of the azimuth plane or the elevation plane.

Furthermore, in some implementations, the one or more control devices 140 can be communicatively coupled to the RF phase shifter circuit 110. In this manner, the one or more control devices 140 can be configured to control the millimeter wave phase shifters 112 thereof to steer the radiation pattern of the wideband phased array antenna 120 along at least one of the azimuth plane or the elevation plane.

As shown, the one or more control devices 140 can include one or more processors 132 and one or more memory devices 144. The one or more processors 142 can include any suitable processing device, such as a microprocessor, microcontroller, integrated circuit, logic device, or other suitable processing device. The one or more memory devices 144 can include one or more computer-readable media, including, but not limited to, non-transitory computer-readable media, RAM, ROM, hard drives, flash drives, or other memory devices.

The one or more memory devices 144 can store information accessible by the one or more processors 142, including computer-readable instructions that can be executed by the one or more processors 142. The computer-readable instructions can be any set of instructions that, when executed by the one or more processors 142, cause the one or more processors 142 to perform operations. The computer-readable instructions can be software written in any suitable programming language or may be implemented in hardware. In some implementations, the computer-readable instructions can be executed by the one or more processors to cause the one or more processors to perform operations, such as controlling the antenna cells 200 of the wideband phased array antenna 120. Additionally, the operations can include controlling one or more millimeter wave phase shifters 112 of the RF phase shifter circuit 110.

Figure 2:
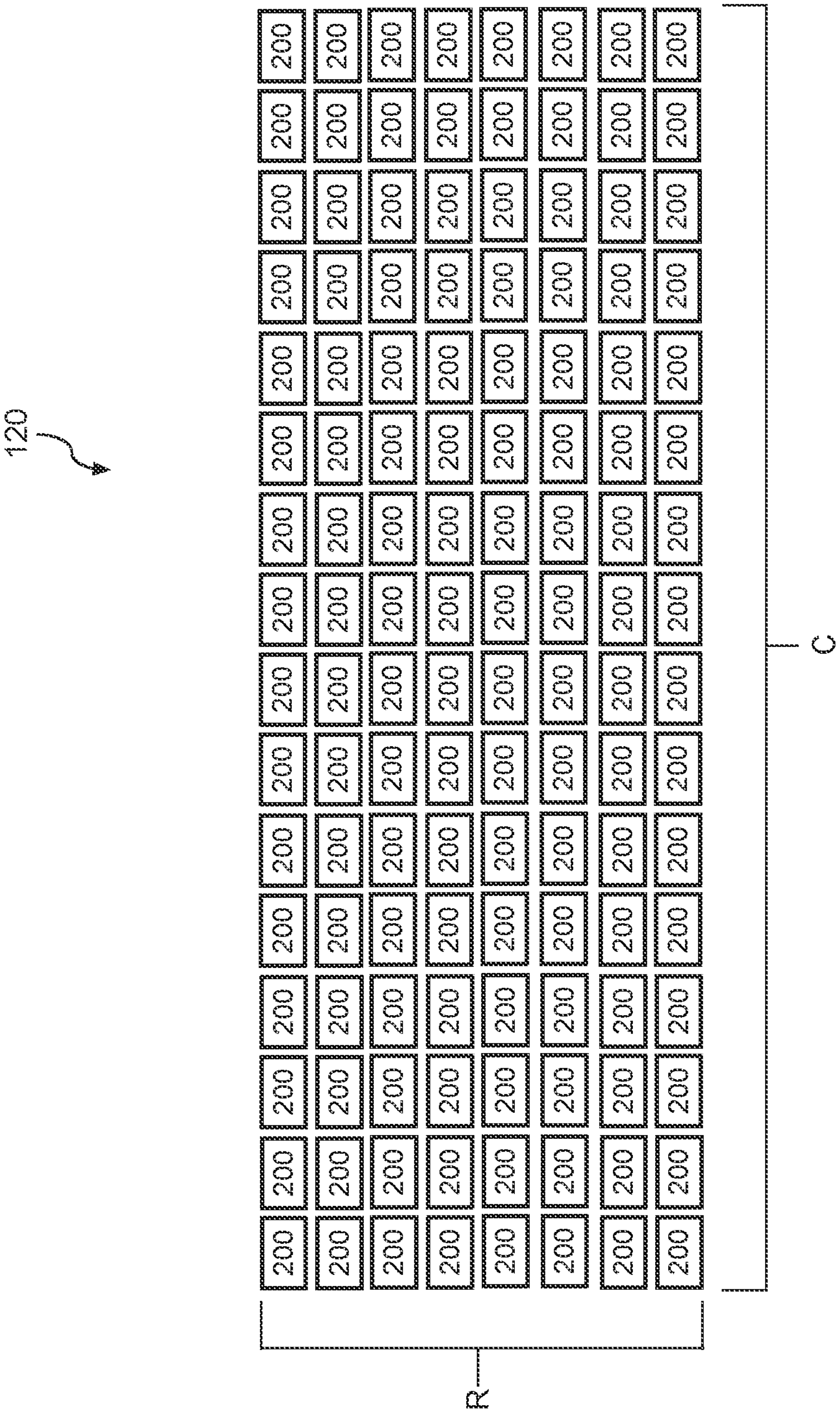
FIG. 2 depicts a wideband phased array antenna according to example embodiments of the present disclosure.

Referring now to FIG. 2, an example embodiment of the wideband phased array antenna 120 is provided according to example embodiments of the present disclosure. As shown, in some implementations, the wideband phased array antenna 120 can include 128 separate antenna cells 200 arranged in a row-column configuration. For instance, the row-column configuration can include 8 separate rows R of antenna cells 200 and 16 separate columns C of antenna cells 200. It should be understood that, in alternative implementations, the wideband phased array antenna 120 can include more or fewer antenna cells 200. Details of the antenna cells 200 will now be discussed in more detail.

Figure 3:
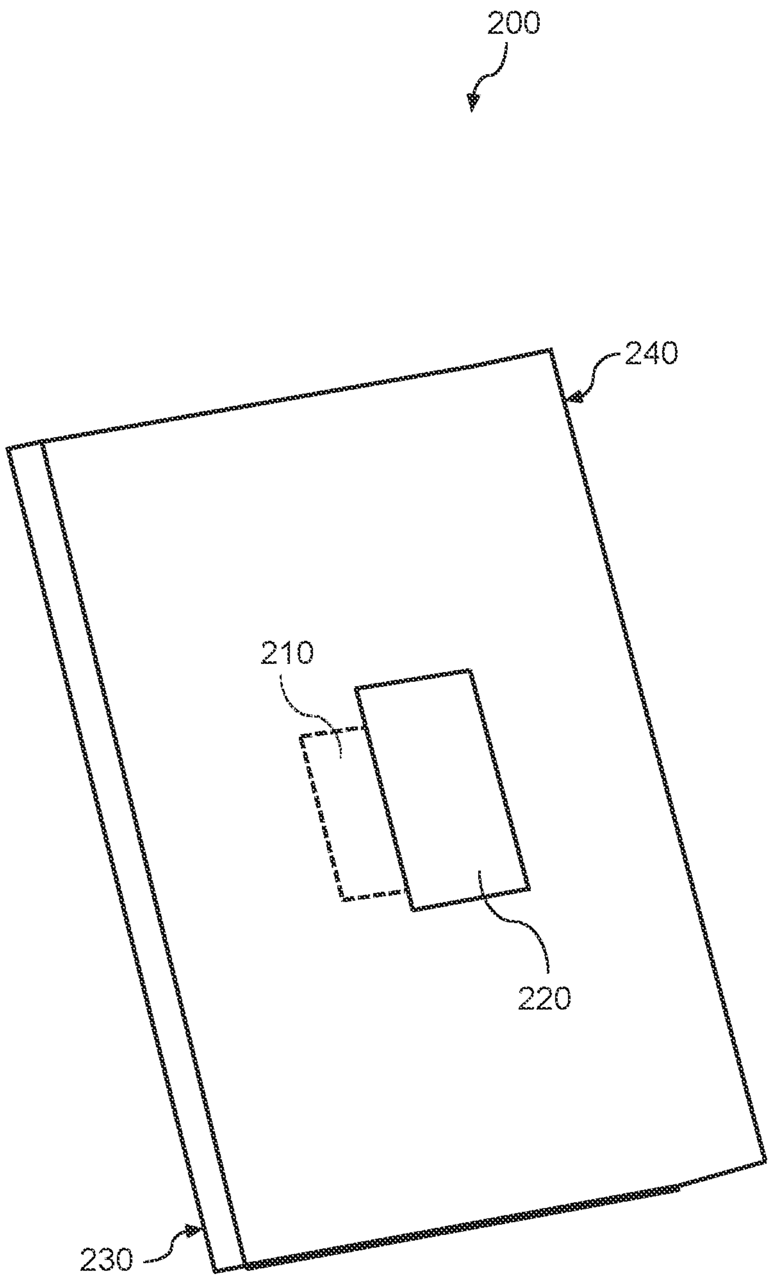
FIG. 3 depicts an antenna cell of the wideband phased array antenna of FIG. 2 according to example embodiments of the present disclosure.
Figure 4:
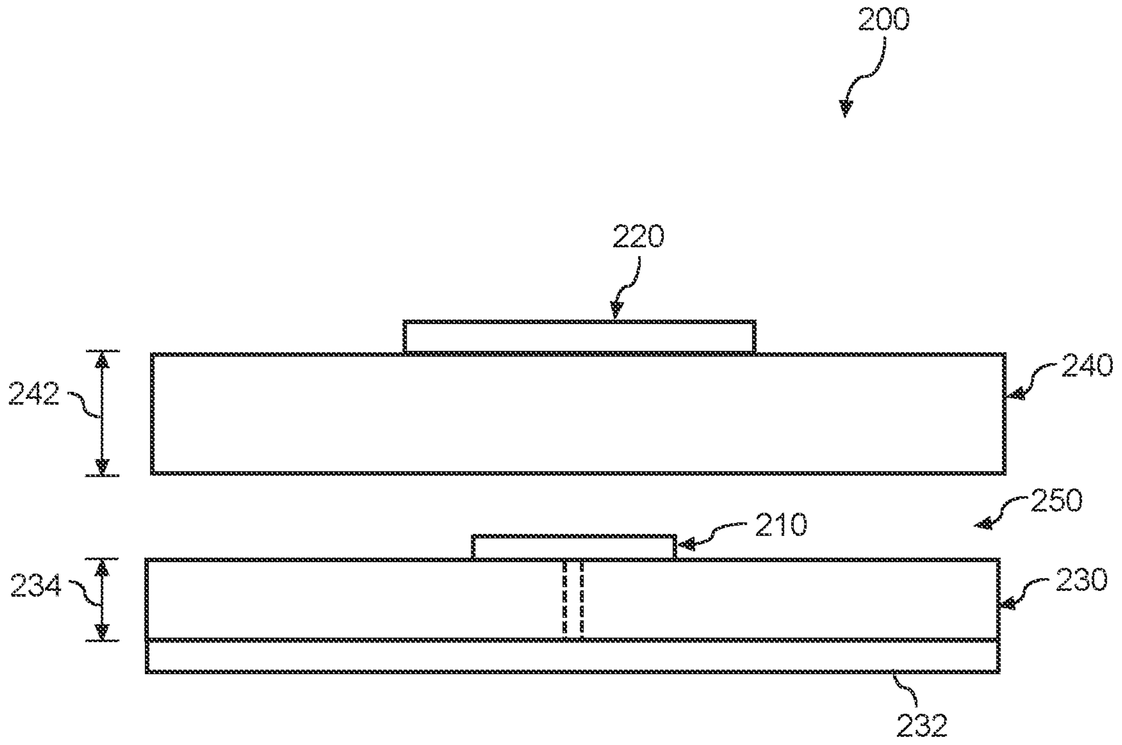
FIG. 4 depicts a side view of the antenna cell of FIG. 3 according to example embodiments of the present disclosure.

Referring now to FIGS. 3 and 4, an example embodiment of an antenna cell 200 of the wideband phased array antenna 120 (shown in FIG. 2) is provided according to example embodiments of the present disclosure. As shown, the antenna cell 200 can include a driven element 210 and a parasitic element 220. The driven element 210 can be electrically coupled to an RF source (e.g., RF source 130 of FIG. 1) via a phase shifter circuit (e.g., RF phase shifter circuit 110 of FIG. 1). The parasitic element 220 can be electromagnetically coupled with the driven element 210. In this manner, a radiation pattern associated with the antenna cell 200 can be modified (e.g., steered) via electromagnetically coupling between the driven element 210 and the parasitic element 220. Furthermore, the electromagnetic coupling between the driven element 210 and the parasitic element 220 can increase the bandwidth of the corresponding antenna cell. For instance, in some implementations, the bandwidth of each of the antenna cells can be about 1400 Megahertz (MHz).

In some implementations, the driven element 210 and the parasitic element 220 can each include a patch antenna. For instance, the driven element 210 can include a first patch antenna disposed on a first substrate 230. The first substrate 230 can include a first dielectric material having a first permittivity, $\varepsilon_{R1}$. In some implementations, the first substrate 230 can be positioned on a ground plane 232. In alternative implementations, the ground plane 232 can be integral (e.g., part of) with the first substrate 230. In such implementations, the driven element 210 can be positioned on a surface of the first substrate 230 that is opposite the ground plane 232.

The parasitic element 220 can include a second patch antenna disposed on a second substrate 240 positioned relative to the first substrate 230 such that a gap 250 is defined between the first substrate 230 and the second substrate 240. In some implementations, a foam (not shown) can be positioned within the gap 250 between the first substrate 230 and the second substrate 240.

The second substrate 240 can include a second dielectric material having a second permittivity, $\varepsilon_{R2}$. The second dielectric material can be different from the first dielectric material. For instance, in some implementations, the first dielectric material can include a first polytetrafluoroethylene (PTFE) composite (e.g., Rogers RO3006), whereas the second dielectric material can include a second PTFE composite (e.g., Rogers RT5880) that is different from the first PTFE composite. Alternatively, or additionally, the first permittivity, $\varepsilon_{R1}$, can be greater than the second permittivity, $\varepsilon_{R2}$. For instance, in some implementations, a ratio of the first permittivity, $\varepsilon_{R1}$, to the second permittivity, $\varepsilon_{R2}$, can be about 3.

In some implementations, the parasitic element 220 (e.g., second patch antenna) disposed on the second substrate 240 can be larger than the driven element 210 (e.g., first patch antenna) disposed on the first substrate 230. For instance, a cross-sectional area of the parasitic element 220 can be greater than a cross-sectional area of the driven element 210. In this manner, the parasitic element 220 can be larger than the driven element 210.

In some implementations, a thickness 242 of the second substrate 240 on which the parasitic element 220 is disposed can be greater than a thickness 234 of the first substrate 230 on which the driven element 210 is disposed. In this manner, the second substrate 240 can be thicker than the first substrate 230. In some implementations, a ratio of the thickness 242 of the second substrate 240 to the thickness 234 of the first substrate can be about 2.

Furthermore, in some implementations, a length dimension of the first substrate 230 on which the driven element 210 is disposed can be substantially the same as a length dimension of the second substrate 240 on which the parasitic element 220 is disposed. Alternatively, or additionally, a width dimension of the first substrate 230 can be substantially the same as a width dimension of the second substrate 240 on which the parasitic element 220 is disposed.

As discussed above, the driven element 210 can be electrically coupled to the RF source 130 (shown in FIG. 1) via the RF phase shifter circuit 110 (also shown in FIG. 1). For instance, in some implementations, the driven element 210 can be electrically coupled to the RF phase shifter circuit 110 via a transmission line (e.g., RF coaxial cable). The transmission line 260 can, in some implementations, extend through an aperture (denoted by dashed line) defined by the first substrate 230.

Figure 5:
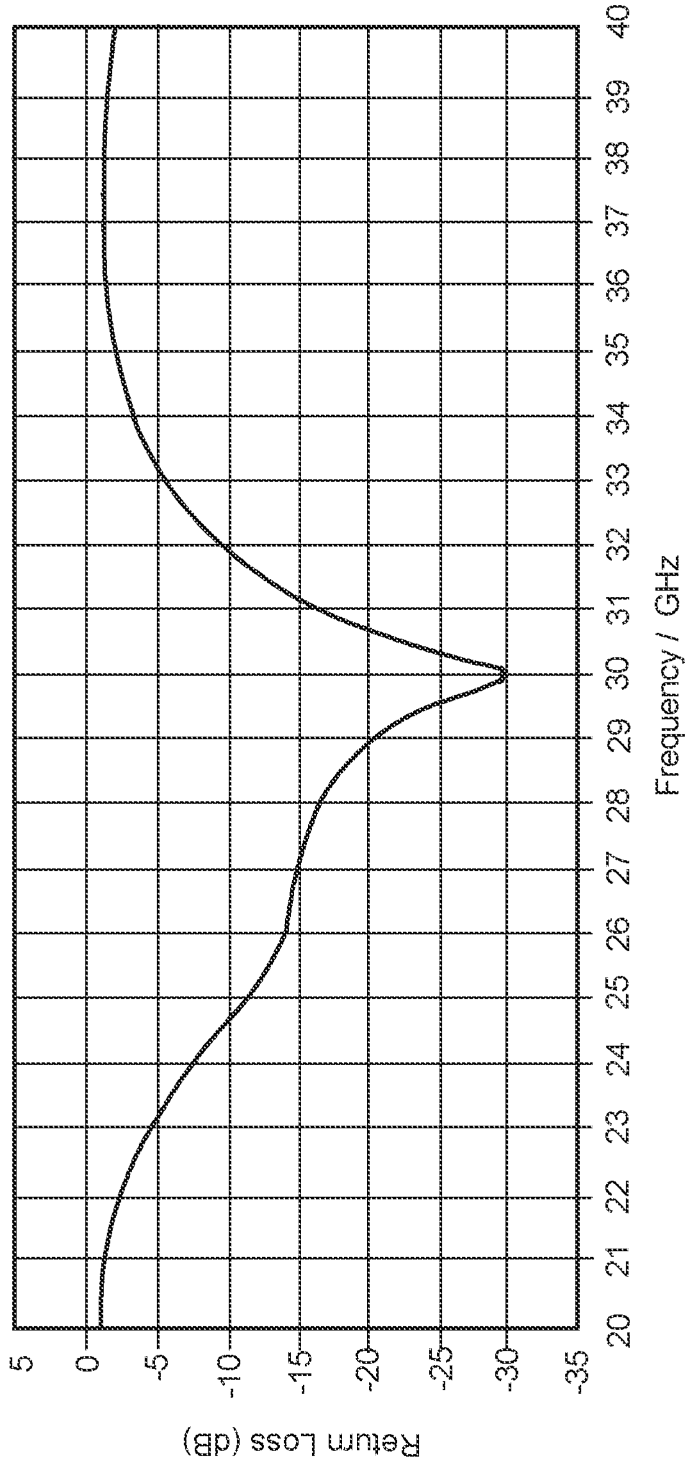
FIG. 5 depicts a graphical illustration of return loss associated with the antenna cell of FIG. 3 according to example embodiments of the present disclosure.

Referring now to FIG. 5, a graphical illustration of return loss associated with the antenna cell 200 over a frequency band is provided according to example embodiments of the present disclosure. As shown, the graphs illustrate return loss (denoted along the vertical axis in decibels) associated with the antenna cell 200 as a function of frequency (denoted along the horizontal axis in gigahertz). More specifically, the graphs illustrate return loss of the antenna cell 200 over a range of frequencies that spans from 20 GHz to 40 GHz.

Figure 6:
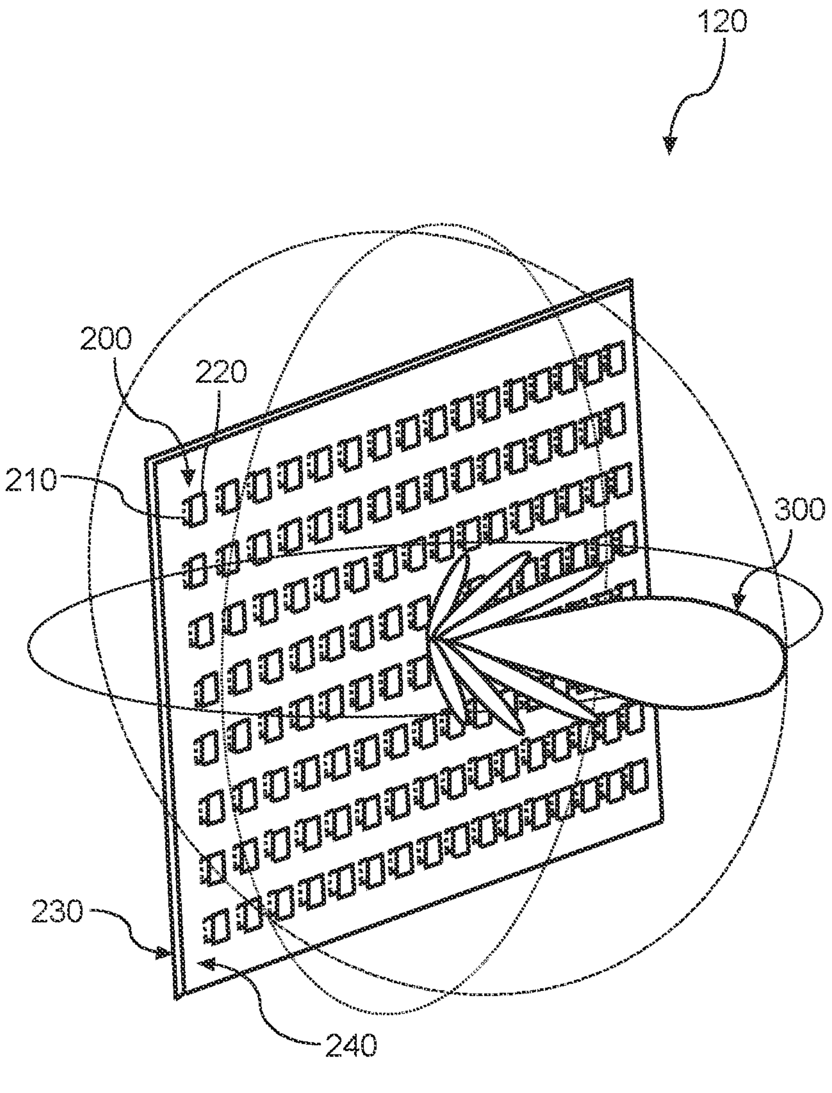
FIG. 6 depicts a graphical representation of a radiation pattern of a wideband phased array antenna in an azimuth plane according to example embodiments of the present disclosure.

Referring now to FIG. 6, a radiation pattern 300 associated with the wideband phased array antenna 120 is provided according to example embodiments of the present disclosure. The RF phase shifter circuit 110 (shown in FIG. 1) can control a phase shift of the RF signal the RF source 130 (shown in FIG. 1) provides to the wideband phased array antenna 120. In this manner, the radiation pattern 300 can be steered in one or more directions without physically moving one or more of the antenna cells 200 of the wideband phased array antenna 120. For instance, the phase shift of the RF signal can be controlled to steer the radiation pattern 300 along a first plane (e.g., azimuth plane). Alternatively, or additionally, the phase shift of the RF signal can be controlled to steer the radiation pattern 300 along a second plane (e.g., elevation plane) that is substantially perpendicular (e.g., within about 10 degrees, within about 5 degrees, within about 1 degree, etc.) to the first plane (e.g., azimuth plane).

Figure 7:
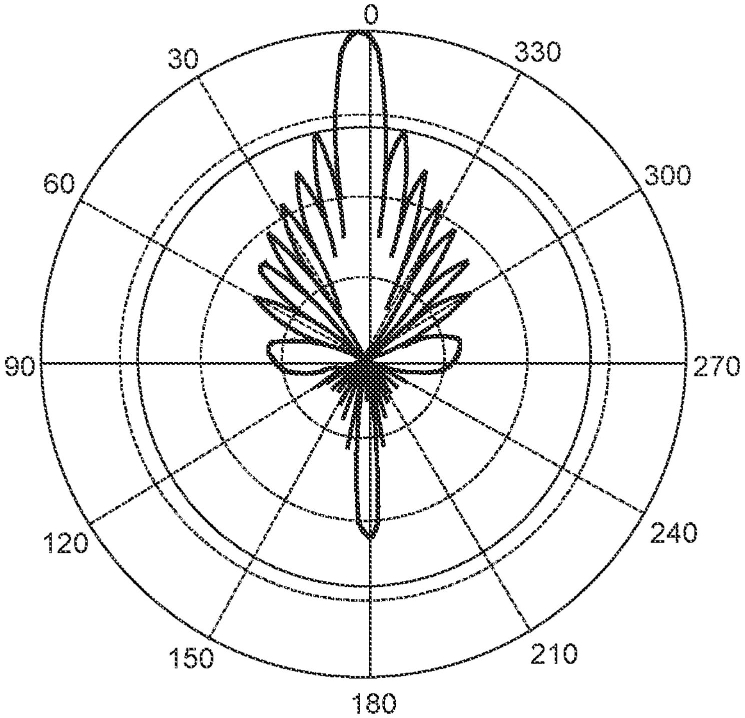
FIG. 7 depicts a graphical representation of a radiation pattern of a phased array antenna in an azimuth plane according to example embodiments of the present disclosure.
Figure 8:
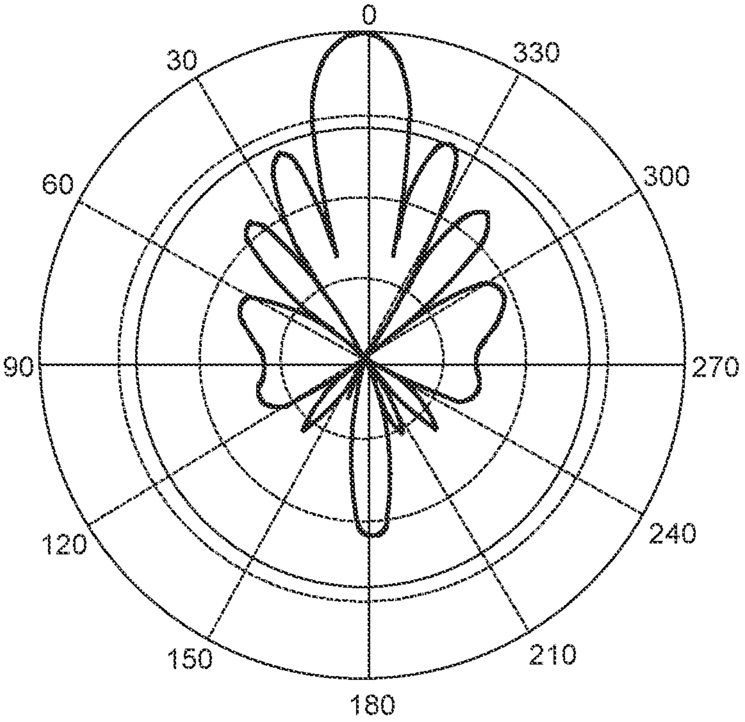
FIG. 8 depicts a graphical representation of a radiation pattern of a wideband phased array antenna in an elevation plane according to example embodiments of the present disclosure.

Referring now to FIGS. 7 and 8, a graphical illustration of a radiation pattern associated with a wideband phased array antenna is provided according to example embodiments of the present disclosure. FIG. 7 depicts the radiation pattern of the wideband phased array antenna in an azimuth plane according to example embodiments of the present disclosure. FIG. 8 depicts the radiation pattern of the wideband phased array antenna in an elevation plane according to example embodiments of the present disclosure. In some implementations, a gain of a main lobe of the radiation pattern in the azimuth plane (FIG. 7) is substantially the same as a gain of a main lobe of the radiation pattern in the elevation plane (FIG. 8).

Figure 9:
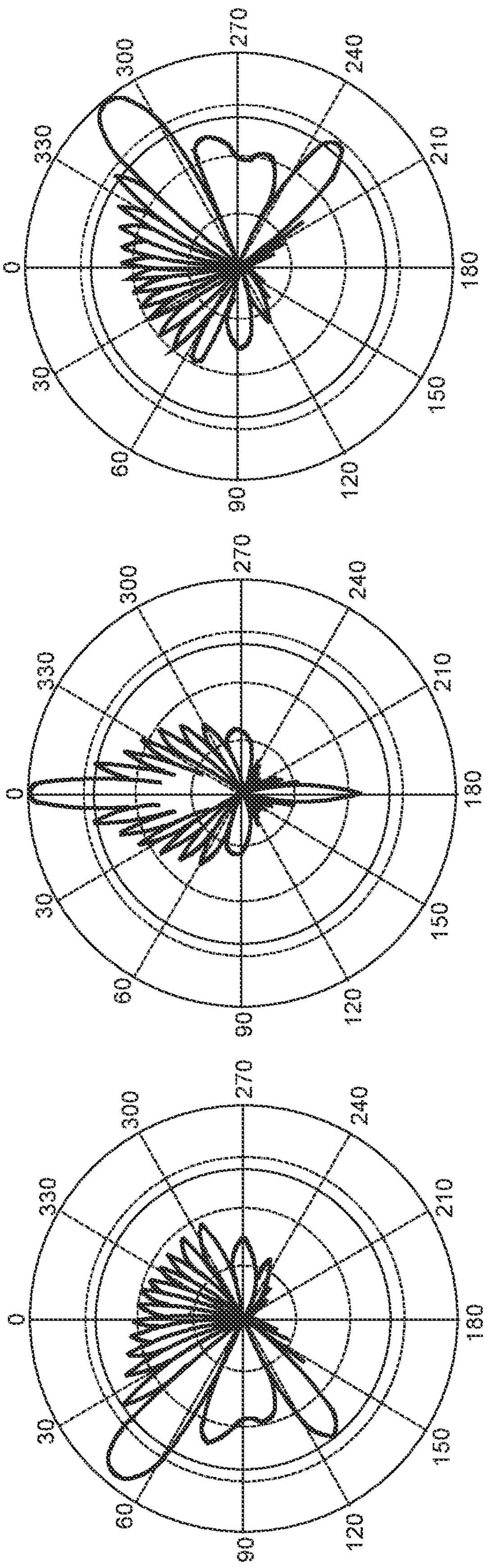
FIG. 9 depicts a graphical representation of a scan range of a wideband phased array antenna in an azimuth plane according to example embodiments of the present disclosure.
Figure 10:
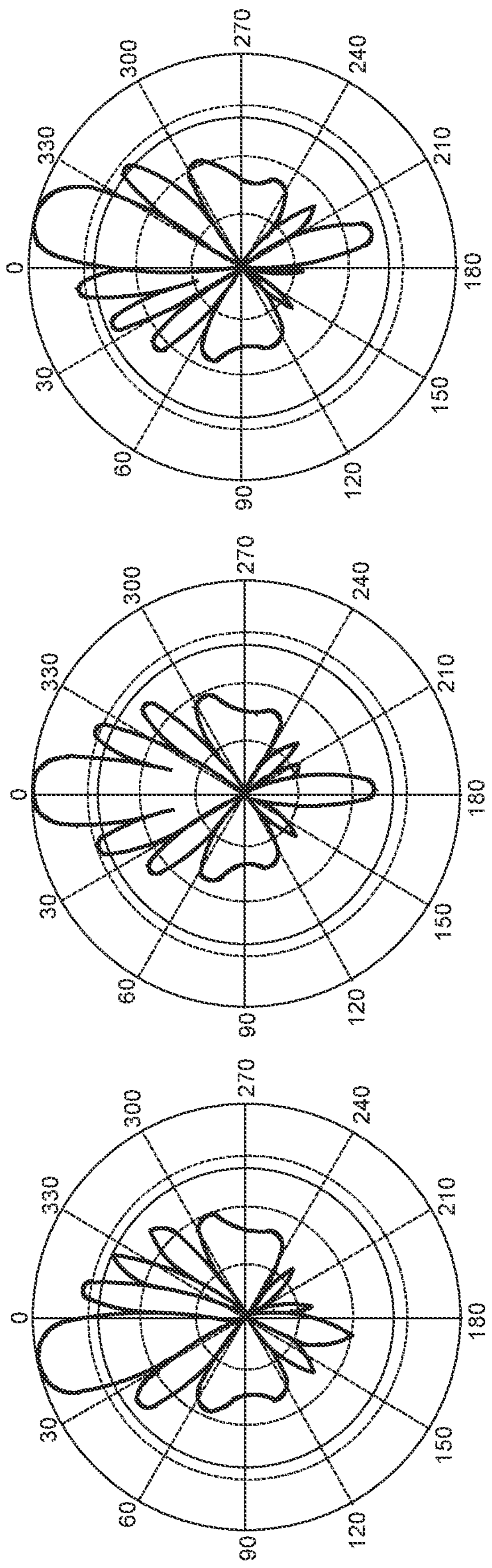
FIG. 10 depicts a graphical representation of a scan range of a wideband phased array antenna in an elevation plane according to example embodiments of the present disclosure.

Referring now to FIGS. 9 and 10, a graphical illustration of a scan range of a wideband phased array antenna is provided according to example embodiments of the present disclosure. FIG. 9 depicts the scan range of the wideband phased array antenna in an azimuth plane. FIG. 10 depicts the scan range of the wideband phased array antenna in an elevation plane. As shown, the scan range in the azimuth plan can be wider than the scan range in the elevation plane. For instance, in some implementations, the scan range in the azimuth plane can be about 100 degrees, whereas the scan range in the elevation plane can be about 30 degrees. In some implementations, the scan range in the azimuth plane can range from 80 degrees to 120 degrees, whereas the scan range in the elevation plane can range from 240 degrees to 40 degrees.

Figure 11:
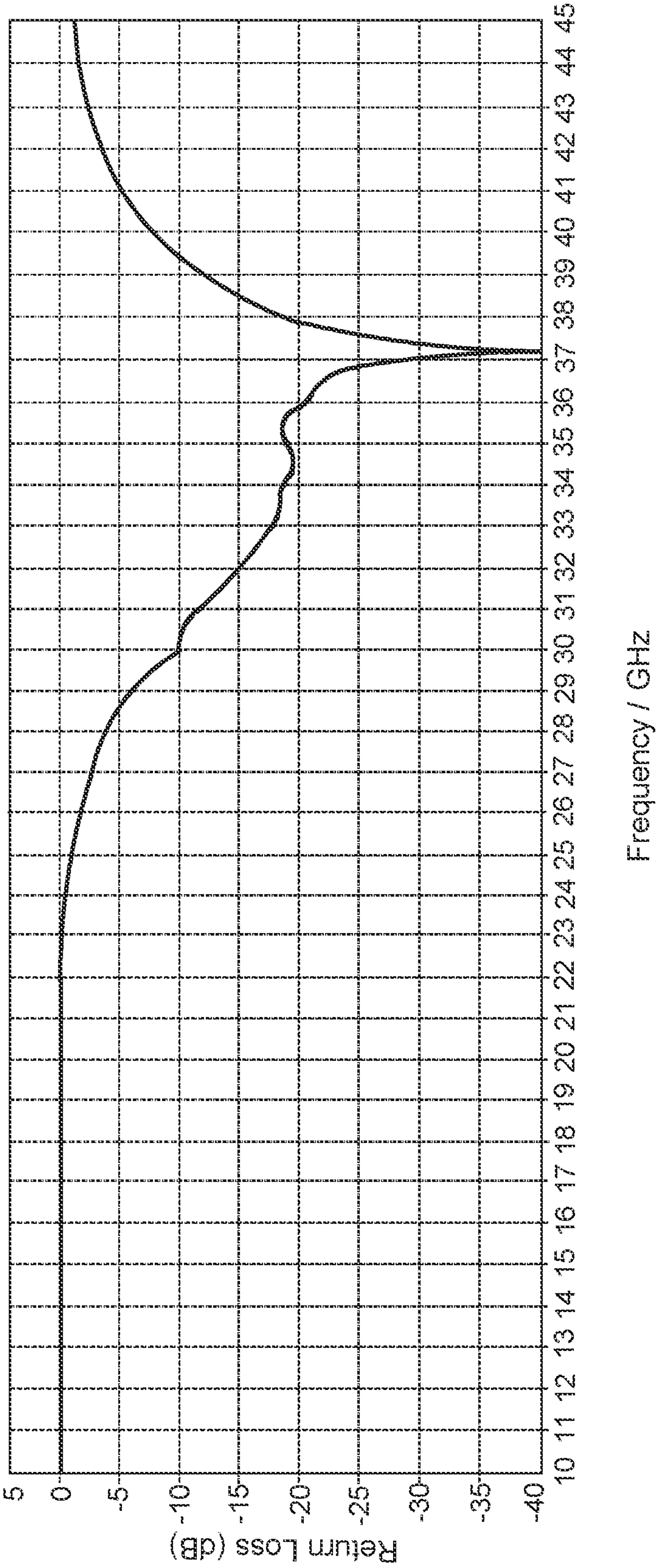
FIG. 11 depicts a graphical representation of return loss associated with a wideband phased array antenna according to example embodiments of the present disclosure.

Referring now to FIG. 11, a graphical illustration of return loss associated with the wideband phased array antenna 120 over a frequency band is provided according to example embodiments of the present disclosure. As shown, the graphs illustrate return loss (denoted along the vertical axis in decibels) associated with the wideband phased array antenna 120 as a function of frequency (denoted along the horizontal axis in gigahertz). More specifically, the graphs illustrate return loss of the wideband phased array antenna 120 over a range of frequencies that spans from 30 GHz to 40 GHz.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wideband phased array antenna comprising:

a plurality of antenna cells, one or more of the antenna cells comprising:

a driven element disposed on a first substrate, the first substrate comprising a first dielectric material; and a parasitic element disposed on a second substrate to provide a stacked patch topology, the second substrate comprising a second dielectric material, the second dielectric material being different than the first dielectric material, wherein an area of the driven element is smaller than an area of the parasitic element.

2. The wideband phased array antenna of claim 1, wherein:

the driven element comprises a first patch antenna; and the parasitic element comprises a second patch antenna.

3. The wideband phased array antenna of claim 1, wherein a scan range of the wideband phased array antenna in an azimuth plan is wider than a scan range of the wideband phased array antenna in an elevation plane.

4. The wideband phased array antenna of claim 1, wherein:

the first dielectric material has a first permittivity; and the second dielectric material has a second permittivity, the second permittivity being different than the first permittivity.

5. The wideband phased array antenna of claim 4, wherein the first permittivity is greater than the second permittivity.

6. The wideband phased array antenna of claim 5, wherein a ratio of the first permittivity to the second permittivity is about 3.

7. The wideband phased array antenna of claim 1, the first dielectric material comprises a first polytetrafluoroethylene (PTFE) composite; and the second dielectric material comprises a second PTFE composite, the second PTFE composite being different than the first PTFE.

8. The wideband phased array antenna of claim 1, wherein the second substrate is thicker than the first substrate.

9. The wideband phased array antenna of claim 8, wherein a ratio of a thickness of the second substrate to a thickness of the first substrate is about 2.

10. The wideband phased array antenna of claim 1, wherein each of the antenna cells are configured to communicate over a frequency band ranging from 24 GHz to 52 GHz.

11. The wideband phased array antenna of claim 1, wherein the driven element of each of the one or more antenna cells is coupled to a radio frequency (RF) source via a phase shifter circuit.

12. An antenna system comprising:

a wideband phased array antenna electrically coupled to a phase shifter circuit, the wideband phased array antenna comprising a plurality of antenna cells, one or more of the antenna cells comprising:

a driven element disposed on a first substrate, the first substrate comprising a first dielectric material; and a parasitic element disposed on a second substrate to provide a stacked patch topology, the second substrate comprising a second dielectric material, the second dielectric material being different than the first dielectric material, wherein an area of the driven element is smaller than an area of the parasitic element.

13. The antenna system of claim 12, wherein:

the first dielectric material has a first permittivity; and the second dielectric material has a second permittivity, the second permittivity being different than the first permittivity.

14. The antenna system of claim 13, wherein the first permittivity is greater than the second permittivity.

15. The antenna system of claim 12, wherein a bandwidth of the one or more antenna cells of the plurality of antenna cells is about 1400 megahertz.

16. The antenna system of claim 12, wherein a gain associated with a main lobe of a radiation pattern of the wideband phased array antenna in an azimuth plane is substantially the same as a gain associated with a main lobe of a radiation pattern of the wideband phased array antenna in an elevation plane.

17. The antenna system of claim 12, wherein a scan range of the wideband phased array antenna in an azimuth plane is wider than a scan range of the wideband phased array antenna in an elevation plane.

18. The antenna system of claim 17, wherein:

the scan range in the azimuth plane is about 100 degrees; and the scan range in the elevation plane is about 30 degrees.

19. The antenna system of claim 12, wherein the driven element comprises a first patch antenna, and wherein the parasitic element comprises a second patch antenna.

20. The antenna system of claim 12, wherein the second substrate is thicker than the first substrate.

* * * * *